United States Patent
Alvarado et al.

(10) Patent No.: US 12,407,802 B2
(45) Date of Patent: Sep. 2, 2025

(54) METHOD FOR RETRIEVING DISPARITY INFORMATION FROM A STEREO IMAGE PAIR

(71) Applicant: Carnegie Robotics, LLC, Pittsburgh, PA (US)

(72) Inventors: Matthew John Alvarado, Pittsburgh, PA (US); John Paul Thomas Atkinson, Pittsburgh, PA (US); David Larose, Pittsburgh, PA (US)

(73) Assignee: CARNEGIE ROBOTICS, LLC, Pittsburgh, PA (US)

( * ) Notice: Subject to any disclaimer, the term of this patent is extended or adjusted under 35 U.S.C. 154(b) by 49 days.

(21) Appl. No.: 18/404,184

(22) Filed: Jan. 4, 2024

(65) Prior Publication Data
US 2025/0227215 A1    Jul. 10, 2025

(51) Int. Cl.
*H04N 13/128* (2018.01)
*H04N 13/111* (2018.01)
*H04N 13/239* (2018.01)
*H04N 13/00* (2018.01)

(52) U.S. Cl.
CPC ......... *H04N 13/128* (2018.05); *H04N 13/111* (2018.05); *H04N 13/239* (2018.05); *H04N 2013/0081* (2013.01)

(58) Field of Classification Search
CPC .. H04N 13/128; H04N 13/111; H04N 13/239; H04N 2013/0081
USPC .......................................................... 348/47
See application file for complete search history.

(56) References Cited

U.S. PATENT DOCUMENTS

| | | | | |
|---|---|---|---|---|
| 2019/0362514 | A1* | 11/2019 | Sinha | G06T 7/593 |
| 2022/0237414 | A1* | 7/2022 | Zhang | A01M 21/00 |
| 2024/0404093 | A1* | 12/2024 | Jeong | G06T 7/593 |

OTHER PUBLICATIONS

Fan, Xiule et al., "Occlusion-Aware Self-Supervised Stereo Matching with Confidence Guided Raw Disparity Fusion", 2022 19th Conference on Robots and Vision (CRV), IEEE, May 31, 2022, pp. 132-139.

(Continued)

*Primary Examiner* — Susan E. Hodges
(74) *Attorney, Agent, or Firm* — Workman Nydegger

(57) ABSTRACT

A method and a system for retrieving disparity information from a stereo image pair including a first and second images obtained by first and second cameras, respectively. The first and second images are provided to a conventional disparity algorithm to an artificial intelligence (AI) driven disparity algorithm. Using the conventional disparity algorithm, the first disparity information is derived from the stereo image pair, and a confidence score function is associated with the derived first disparity information. Using the AI-driven disparity algorithm, second disparity information is derived from at least part of the stereo image pair. The first and second disparity information are fused by giving priority to the first disparity information in regions of the stereo image pair with a high confidence score and giving priority to the second disparity information in regions of the stereo image pair with a low confidence score, thereby obtaining resultant disparity information.

16 Claims, 9 Drawing Sheets

(56) References Cited

OTHER PUBLICATIONS

Lu, Yawen et al., "Self-supervised Depth Estimation from Spectral Consistency and Novel View Synthesis", 2022 International Joint Conference on Neural Networks (IJCNN), IEEE, Jul. 18, 2022, pp. 1-8.

Extended European Search Report from Corresponding European Patent Application No. EP24220050.9, Jun. 10, 2025.

* cited by examiner

Fig. 8

Disparity

| | A | B | C | D | E | F | G | H | I | J | K | L | M | N | O | P |
|---|---|---|---|---|---|---|---|---|---|---|---|---|---|---|---|---|
| 1 | 33.61 | 33.70 | 32.67 | 33.60 | 33.60 | 33.67 | 33.69 | 33.61 | 33.63 | 33.63 | 33.67 | 33.69 | 33.64 | 33.68 | 33.63 | 33.64 |
| 2 | 32.68 | 32.63 | 32.68 | 32.68 | 32.65 | 32.68 | 32.69 | 32.65 | 32.66 | 32.68 | 32.66 | 32.60 | 32.62 | 32.66 | 32.64 | 32.62 |
| 3 | 22.51 | 16.57 | 31.07 | 16.51 | 31.63 | 31.63 | 31.66 | 31.68 | 31.61 | 31.67 | 31.66 | 31.65 | 31.69 | 31.67 | 31.62 | 31.70 |
| 4 | 20.29 | 26.43 | 21.42 | 23.16 | 30.68 | 30.68 | 30.68 | 30.68 | 30.68 | 30.65 | 30.68 | 30.65 | 30.68 | 30.65 | 30.67 | 30.70 |
| 5 | 16.64 | 24.20 | 24.00 | 26.16 | 29.67 | 29.70 | 29.67 | 29.60 | 29.65 | 29.62 | 29.66 | 13.04 | 13.04 | 13.04 | 13.04 | 13.04 |
| 6 | 17.77 | 26.35 | 16.36 | 15.23 | 28.61 | 28.69 | 28.67 | 28.62 | 28.69 | 28.63 | 28.67 | 13.04 | 13.04 | 13.04 | 13.04 | 13.04 |
| 7 | 24.26 | 20.06 | 16.82 | 20.48 | 27.70 | 27.63 | 27.63 | 27.67 | 27.66 | 27.63 | 27.63 | 13.04 | 13.04 | 13.04 | 13.04 | 13.04 |
| 8 | 26.62 | 26.61 | 26.69 | 26.69 | 26.64 | 26.65 | 26.61 | 26.63 | 26.65 | 26.62 | 26.68 | 13.04 | 13.04 | 13.04 | 13.04 | 13.04 |
| 9 | 25.61 | 25.64 | 25.66 | 25.67 | 25.66 | 25.65 | 25.64 | 25.63 | 25.69 | 25.63 | 25.65 | 13.04 | 13.04 | 13.04 | 13.04 | 13.04 |
| 10 | 24.70 | 24.62 | 24.69 | 24.68 | 24.70 | 24.64 | 24.70 | 24.62 | 24.65 | 24.69 | 24.68 | 13.04 | 13.04 | 13.04 | 13.04 | 13.04 |
| 11 | 23.66 | 23.68 | 23.69 | 23.65 | 23.69 | 23.61 | 23.67 | 23.69 | 23.66 | 23.60 | 23.69 | 13.04 | 13.04 | 13.04 | 13.04 | 13.04 |
| 12 | 22.66 | 22.69 | 22.69 | 22.69 | 22.62 | 22.62 | 22.69 | 22.64 | 22.67 | 22.60 | 22.63 | 13.04 | 13.04 | 13.04 | 13.04 | 13.04 |
| 13 | 21.64 | 21.65 | 21.63 | 21.65 | 21.67 | 21.63 | 21.70 | 21.63 | 21.62 | 21.65 | 21.69 | 13.04 | 13.04 | 13.04 | 13.04 | 13.04 |
| 14 | 20.64 | 20.66 | 20.65 | 20.63 | 20.66 | 20.64 | 20.69 | 20.66 | 20.62 | 20.66 | 20.62 | 13.04 | 13.04 | 13.04 | 13.04 | 13.04 |
| 15 | 19.64 | 19.69 | 19.62 | 19.65 | 19.66 | 19.70 | 19.64 | 19.61 | 19.69 | 19.69 | 19.67 | 13.04 | 13.04 | 13.04 | 13.04 | 13.04 |
| 16 | 18.65 | 18.63 | 18.61 | 18.64 | 18.62 | 18.64 | 18.69 | 18.63 | 18.66 | 18.66 | 18.62 | 13.04 | 13.04 | 13.04 | 13.04 | 13.04 |
| 17 | 17.69 | 17.68 | 17.68 | 17.69 | 17.61 | 17.64 | 17.61 | 17.62 | 17.66 | 17.64 | 17.65 | 13.04 | 13.04 | 13.04 | 13.04 | 13.04 |
| 18 | 16.64 | 16.61 | 16.68 | 16.61 | 16.66 | 16.69 | 16.61 | 16.67 | 16.63 | 16.66 | 16.60 | 13.04 | 13.04 | 13.04 | 13.04 | 13.04 |
| 19 | 15.61 | 15.64 | 15.69 | 15.63 | 15.62 | 15.66 | 15.68 | 15.68 | 15.68 | 15.64 | 15.66 | 13.04 | 13.04 | 13.04 | 13.04 | 13.04 |
| 20 | 14.61 | 14.63 | 14.62 | 14.62 | 14.68 | 14.66 | 14.68 | 14.69 | 14.67 | 14.68 | 14.61 | 13.04 | 13.04 | 13.04 | 13.04 | 13.04 |
| 21 | 13.69 | 13.68 | 13.67 | 13.69 | 13.68 | 13.67 | 13.67 | 13.60 | 13.63 | 13.67 | 13.61 | 13.04 | 13.04 | 13.04 | 13.04 | 13.04 |
| 22 | 12.68 | 12.67 | 12.60 | 12.66 | 12.66 | 12.68 | 12.68 | 12.65 | 12.68 | 12.68 | 12.66 | 12.67 | 12.63 | 12.65 | 12.69 | 12.60 |
| 23 | 11.61 | 11.63 | 11.64 | 11.70 | 11.62 | 11.63 | 11.64 | 11.64 | 11.67 | 11.60 | 11.66 | 11.69 | 11.68 | 11.64 | 11.70 | 11.63 |

Distance

METHOD FOR RETRIEVING DISPARITY INFORMATION FROM A STEREO IMAGE PAIR

FIELD OF THE INVENTION

The present invention relates to a method for retrieving disparity information from a stereo image pair comprising a first image obtained by a first camera and a second image obtained by a second camera. The retrieved disparity information may, e.g., be applied for deriving depth or distance information from the stereo image pair. The method according to the invention addresses limitations of current stereo algorithms, allowing computation of accurate disparity information for image regions in which accurate disparity information is typically not recoverable. The invention further provides a system for generating stereo images by means of such a method.

BACKGROUND OF THE INVENTION

Conventional images capture the three-dimensional world in two dimensions, thus losing information regarding depth. In order to associate depth information with such a two-dimensional image, various approaches have been applied. One approach, sometimes referred to as Stereo Vision, applies a pair of cameras, finds corresponding points in images from the two cameras, and estimates the depth based on disparity.

A classical or conventional approach to deriving disparity information applies a stereo-matching technique to a rectified pair of stereo images, i.e. a left image and a right image. This technique computes correspondence between the pixels of the left and right image by comparing pixel-neighbourhood information for both images. In this context, corresponding points are pixel locations of the left and right images, respectively, that are projections of the same three-dimensional points captured in both of the images. From such correspondence information, a distance to the three-dimensional point can be estimated, and depth information can be derived.

This approach is similar to the process taking place in the human brain, based on input from two eyes, and it has proved efficient for many purposes. However, there are scenarios where the conventional approach has shortcomings, and disparity information is not readily derivable, or is difficult to derive accurately, and it may therefore not be possible to derive accurate depth information. This is, e.g., the case if the images contain repetitive patterns, making it difficult to determine correspondence between the points of the two images. Another example is situations with low illumination and/or contrast. Yet another example is situations with large depth discontinuities in the image, in which conventional algorithms may have difficulties in obtaining accurate disparity information at boundaries between objects arranged at different distances to the cameras.

As an alternative to the classical or conventional approach described above, artificial intelligence (AI) based algorithms have been applied for deriving disparity information from stereo image pairs in a similar manner. However, this approach has its own challenges. For example, AI based algorithms may struggle with semantically confusing scenes, such as a two-dimensional picture of a three-dimensional structure, and lack the formal geometric underpinnings of conventional approaches.

DESCRIPTION OF THE INVENTION

It is an object of embodiments of the invention to provide a method for retrieving disparity information from a stereo image pair with high accuracy, and without requiring excessive computational resources.

It is a further object of embodiments of the invention to provide a system for generating stereo images with highly accurate depth information, without requiring excessive computational resources.

According to a first aspect, the invention provides a method for retrieving disparity information from a stereo image pair, the method comprising the steps of:
- obtaining a stereo image pair comprising a first image obtained by a first camera and a second image obtained by a second camera,
- providing the first image and the second image of the stereo image pair to a conventional disparity algorithm,
- providing the first image and the second image of the stereo image pair to an artificial intelligence (AI) driven disparity algorithm,
- using the conventional disparity algorithm, deriving first disparity information from the stereo image pair and associating a confidence score function to the derived first disparity information,
- using the AI driven disparity algorithm, deriving second disparity information from at least part of the stereo image pair, and
- fusing the first disparity information and the second disparity information by giving priority to the first disparity information in regions of the stereo image pair with high confidence score and giving priority to the second disparity information in regions of the stereo image pair with low confidence score, thereby obtaining resultant disparity information.

Thus, the method according to the first aspect of the invention is a method for retrieving disparity information from a stereo image pair. In the present context the term 'disparity information' should be interpreted to mean information related to correspondence of pixel regions captured in two images of a stereo image pair, and from which depth information can be derived.

In the method according to the first aspect of the invention, a stereo image pair is initially obtained. The stereo image pair comprises a first image obtained by a first camera and a second image obtained by a second camera. The first camera and the second camera are preferably arranged immovably with respect to each other, and with detection directions being substantially parallel to each other. Thus, there is an overlap between three-dimensional points captured by the first camera and three-dimensional points captured by the second camera.

The first image and the second image of the stereo image pair are provided to a conventional disparity algorithm. In the present context, the term 'conventional disparity algorithm' should be interpreted to mean an algorithm being capable of retrieving disparity information from a stereo image pair by means of a classical or conventional approach, as described above. Examples of conventional disparity algorithms include, but are not limited to, stereo 'block matching' algorithms and other local stereo algorithms, semi-global matching algorithms, and global matching algorithms, such as those based on graph cut optimization.

Furthermore, the first image and the second image of the stereo image pair are provided to an artificial intelligence (AI) driven disparity algorithm. In the present context, the term 'AI driven disparity algorithm' should be interpreted to mean an algorithm which applies an AI engine, a convolutional neural network, or another data driven machine learning model for obtaining disparity information from a stereo image pair.

Accordingly, the first image and the second image of the stereo image pair are provided to the conventional disparity algorithm as well as to the AI driven disparity algorithm.

Next, the conventional disparity algorithm is applied for deriving first disparity information from the stereo image pair. Thus, the first disparity information is derived from the stereo image pair by means of a classical or conventional approach. Thus, as described above, there might be parts of the first disparity information which are inaccurate or missing, e.g. because it may be difficult to determine correspondence between some of the points of the two images. Accordingly, a confidence score function is associated to the derived first disparity information. The confidence score function provides a measure for the confidence of the derived first disparity information throughout the stereo image pair, and thereby defines how reliable the first disparity information related to various parts of the stereo image pair may be regarded to be. Thus, the confidence score function defines which parts of the first disparity information may be regarded as highly confident or reliable, and which parts may be regarded as less confident or reliable.

The confidence score function may form an integrated part of the first disparity information. For instance, regions with very low confidence score may be provided with a special disparity value, e.g. 'zero' or 'not-a-number', instead of the disparity value that was derived with low confidence, and which may therefore be regarded as unreliable. This will clearly indicate that it was not possible to derive reliable disparity information, so that it is avoided that such unreliable disparity information is accidentally applied later on in the process.

The confidence score function may be derived from texture measures in the first and second images, respectively. For example, the confidence score may be low in areas or regions of the image that have a low texture, as these areas are more difficult to match between the two images. The confidence score may also reflect the extent to which the disparity at a particular pixel is consistent with the disparities of neighbouring pixels, the extent to which it is consistent with the pattern of disparities observed in the rest of the image, and/or the extent to which the content of the input images provides strong information about what is the correct disparity. For example, patterns in the visual information of the first image and/or the second image may provide cues about where discontinuities in the disparity information, i.e. large changes between adjacent pixels, are to be expected, and the confidence score may reflect the extent to which the disparity values are consistent with those cues.

Alternatively or additionally, the confidence score function may be derived based on continuity of the first disparity information among neighbouring regions or pixels within the stereo image pair. For instance, if the first disparity information varies significantly within a region of the stereo image pair and/or varies abruptly from one pixel to another, this may indicate that it was difficult to derive the first disparity information, and a low confidence score should therefore be associated to such regions. Alternatively or additionally, the confidence score may be an actual confidence from the conventional disparity algorithm and/or existence or non-existence of disparity information, e.g. disparity values may be populated by the conventional disparity algorithm in areas with high confidence and not populated in areas with low confidence.

Furthermore, the AI driven disparity algorithm is applied for deriving second disparity information from at least part of the stereo image pair. This may be done prior to, after or simultaneously with the step of deriving the first disparity information. Thus, the second disparity information is derived from the stereo image pair by means of an AI engine, a convolutional neural network, or another data driven machine learning algorithm. The second disparity information may be related to the entire stereo image pair, or it may only be related to selected parts of the stereo image pair. This will be described in further detail below.

Accordingly, disparity information is derived from the stereo image pair using the conventional disparity algorithm, as well as using the AI driven disparity algorithm, in the form of the first disparity information and the second disparity information, respectively.

Finally, the first disparity information and the second disparity information are fused, so as to obtain resultant disparity information. This is done by giving priority to the first disparity information in regions of the stereo image pair with high confidence score and giving priority to the second disparity information in regions of the stereo image pair with low confidence score.

In the present context the term 'giving priority' should be interpreted to cover that either the first disparity information or the second disparity information is selected and applied in a given region or pixel, depending on whether the confidence score is high or low. However, it should still be regarded as 'giving priority' if, for instance, the second disparity information is applied in smaller areas, e.g. individual pixels, even though these smaller areas have a high confidence score, as long as the principle of primarily applying the first disparity information in regions with high confidence and the second disparity information in regions with low confidence is generally fulfilled. Furthermore, the term 'giving priority' should also be interpreted to cover a weighted average of the first disparity information and the second disparity information, taking the confidence score into account in such a manner that the first disparity information is given a higher weight in regions with high confidence score and the second disparity information is given a higher weight in regions with low confidence score. This could be regarded as being similar to a Kalman filter.

Thus, when fusing the first disparity information and the second disparity information, the first, conventionally derived, disparity information is applied to the widest possible extent, and in regions or parts of the stereo image pair where the first disparity information is considered confident or reliable. However, in regions or parts of the stereo image pair where the first, conventionally derived, disparity information is considered less confident or reliable, the first disparity information is supplemented or replaced by the second disparity information, which was derived using the AI driven disparity algorithm.

Accordingly, the simple approach of the conventional disparity algorithm is applied to the widest possible extent, and the approach of the AI driven disparity algorithm is only applied for the regions of the stereo image pair where it may be expected that the first disparity information might be inaccurate or less reliable. It can be expected that the second disparity information is more reliable in these regions, and the AI approach may be expected to efficiently integrate information from all over the image, and to bring semantic knowledge into play. On the other hand, conventional disparity algorithms may be hard to fool, and are often more amenable to quantitative analysis, and may have different failure modes than the AI driven algorithms. Accordingly, the strengths of each of the two approaches are combined. Thus, the resultant disparity information obtained by fusing the first disparity information and the second disparity information may be expected to have a high confidence score throughout the entire stereo image pair. This allows the resultant disparity information to be obtained in a reliable and fast manner, making it suitable for use in applications where fast and frequent updates of accurate depth information is required, e.g. for autonomous navigation of vehicles.

The confidence score function may vary across the stereo image pair. According to this embodiment, the confidence score function may be regarded as a function which applies a value to each point of a two-dimensional image defined by the stereo image pair, e.g. to each pixel of the stereo image pair. The value for a given point indicates the confidence of the disparity information derived for that point by means of the conventional disparity algorithm.

The step of deriving second disparity information may be performed only on parts of the stereo image pair with confidence score below a predefined threshold level. According to this embodiment, the AI driven disparity algorithm is only applied to part of the stereo image pair. More particularly, the AI driven disparity algorithm is only applied to the parts or regions of the stereo image pair with a low confidence score, i.e. with a confidence score below the predefined threshold level, and thereby to parts or regions of the stereo image pair where it can be expected that it is necessary to the supplement or replace the first disparity information with the second disparity information, during the step of fusing the first disparity information and the second disparity information. Thus, deriving the second disparity information is restricted to the parts or regions where it is necessary to apply the second disparity information, and thereby the need for computational power is minimised.

As an alternative, the second disparity information may be derived for the entire stereo image pair.

The method may further comprise the step of providing the first disparity information to the AI driven disparity algorithm, and the step of fusing the first disparity information and the second disparity information may be performed by means of the AI driven disparity algorithm.

According to this embodiment, the AI driven disparity algorithm is not merely provided with the first image and the second image of the stereo image pair. It is also provided with the outcome of the conventional disparity algorithm, in the form of the first disparity information derived from the same stereo image pair. Accordingly, the AI driven disparity algorithm will eventually be in the possession of the first disparity information as well as the second disparity information, and fusing of the first disparity information and the second disparity information can therefore be performed by the AI driven disparity algorithm. In this case, the AI driven disparity algorithm will typically not implement an explicit fusion strategy with an underlying strategy as defined by a conventional approach. However, the AI driven disparity algorithm may typically be trained to provide a similar result as that of a conventional approach. It may, thus, be expected that the resultant disparity information provided by the AI driven disparity algorithm is predominantly identical or similar to a result provided by a conventional approach, but may have some outliers, due to the nature of the AI driven disparity algorithm.

Furthermore, the AI driven disparity algorithm may apply the first disparity information when it derives the second disparity information. For instance, the first disparity information may be applied as a seed for the AI driven disparity algorithm, thus providing a suitable starting point for the AI driven derivation of the second disparity information.

The step of providing the first disparity information to the AI driven disparity algorithm may comprise providing the confidence score function to the AI driven disparity algorithm. According to this embodiment, the AI driven disparity algorithm is provided with the confidence score associated with the first disparity information, in addition to the first disparity information as such. Thus, the AI driven disparity algorithm is provided with information regarding which regions of the stereo image pair have a high confidence score, and where the first disparity information should therefore be applied, as well as information regarding which regions of the stereo image pair have a low confidence score, and where the second disparity information should therefore apply. The AI driven disparity algorithm can then apply this information when performing the step of fusing the first disparity information and the second disparity information, and possibly also when deriving the second disparity information, e.g. by only deriving the second disparity information on parts of the stereo image pair with confidence score below a threshold level.

The step of fusing the first disparity information and the second disparity information may be performed simultaneously with and/or as a part of the step of deriving the second disparity information. According to this embodiment, the second disparity information may not necessarily be separately derived. Instead, the AI driven process may simply result in the resultant disparity information being generated.

As an alternative, the AI driven disparity algorithm may derive the second disparity information, and subsequently fuse the first disparity information and the second disparity information, so as to arrive at the resultant disparity information.

As an alternative to allowing the AI driven disparity algorithm to perform the step of fusing the first disparity information and the second disparity information, the method may further comprise the step of providing the first disparity information and the second disparity information to a separate fusing algorithm, and the step of fusing the first disparity information and the second disparity information may be performed by means of the separate fusing algorithm.

Thus, according to this embodiment, the fusing of the first disparity information and the second disparity information, so as to arrive at the resultant disparity information, takes place at a separate entity in the form of the separate fusing algorithm.

In this case, the method may further comprise the step of providing the first disparity information to the AI driven disparity algorithm, and the step of deriving the second disparity information may further be performed while taking the first disparity information into consideration.

According to this embodiment, even though the step of fusing the first disparity information and the second disparity information is performed by the separate fusing algorithm, and the first disparity information needs to be provided to the separate fusing algorithm, the first disparity information is, in addition thereto, also provided to the AI driven disparity algorithm. Thus, when the AI driven disparity algorithm derives the second disparity information, which also needs to be provided to the separate fusing algorithm, from the stereo image pair, it also takes the first disparity information into account. As described above, the first disparity information may, e.g., be applied as a seed for the AI driven disparity algorithm.

It should be noted that, in the case that the step of fusing the first disparity information and the second disparity information is performed by a separate fusing algorithm, the separate fusing algorithm may apply an AI engine, a convolutional neural network, or another data driven machine learning algorithm for this purpose. For instance, such an AI driven approach may, e.g., include the fusing algorithm generating the resultant disparity information based on the first disparity information, the second disparity information and the confidence score. The remarks set forth above with reference to the AI driven disparity algorithm performing the fusing step are equally applicable here.

The method may further comprise the steps of comparing the first disparity information and the second disparity information, and deriving a resultant confidence score function for the resultant disparity information, based on the comparison.

According to this embodiment, the disparity information derived by means of the conventional disparity algorithm and the disparity information derived by means of the AI driven disparity algorithm are compared to each other. In the case that this comparison reveals regions with good agreement between the disparity information derived by the respective algorithms, this is an indication that the disparity information is highly reliable, and that a high resultant confidence score can therefore be associated to such regions. On the other hand, in the case that the comparison reveals disagreements between the disparity information derived by the respective algorithms, this is an indication that the disparity information is less reliable, and it may be uncertain whether the first disparity information or the second disparity information should be primarily relied on in such regions. Thus, in this case such regions may be provided with a low resultant confidence score.

The step of deriving the first disparity information may comprise identifying one or more features present in the first image as well as in the second image, and determining a displacement between the first image and the second image required in order to obtain an overlap in image regions of the first image and the second image, respectively, corresponding to a given identified feature.

According to this embodiment, at least one feature is identified in the stereo image pair, and groups of pixels in the first image and the second image, respectively, corresponding to the feature are identified. Next, correspondence between regions of the first image and the second image is determined by determining how much the first image and the second image need to be displaced relative to each other before the groups of pixels of the first image and the second image, respectively, overlap. For instance, a number of required pixel shifts may be determined.

The closer the identified feature is to the first and second camera, the larger a displacement is expected in order for the respective pixel groups to overlap. Therefore the determined displacement provides disparity information and depth information.

The step of deriving the second disparity information may comprise applying a trained AI model for identifying correspondences between the first image and the second image. According to this embodiment, correspondence between the first image and the second image is also determined, similarly to the situation described above with reference to the first disparity information. However, in this case the correspondence is determined by means of a trained AI model, rather than by determining a displacement in a conventional manner. For instance, the trained AI model may be applied for recognising corresponding features in the first and second images.

The step of fusing the first disparity information and the second disparity information may comprise applying the first disparity information in regions of the stereo image pair with a confidence score above a predefined threshold level and applying the second disparity information or supplementing the first disparity information with the second disparity information in regions of the stereo image pair with a confidence score below the predefined threshold level.

According to this embodiment, the first disparity information is applied in the regions of the stereo image pair where the confidence score is above the predefined threshold level, and where the first disparity information may therefore be considered reliable and accurate. On the other hand, in regions where the confidence score is below the predefined threshold level, and where the first disparity information may therefore be regarded as less reliable and less accurate, the first disparity information is either replaced or supplemented by the second disparity information, thereby enhancing the reliability and accuracy of the resultant disparity information.

According to a second aspect, the invention provides a system for generating stereo images, the system comprising:
  a first camera and a second camera configured to obtain stereo image pairs comprising a first image obtained by the first camera and a second image obtained by the second camera,
  a conventional disparity information generating unit configured to receive first images obtained by means of the first camera and second images obtained by means of the second camera, and for deriving first disparity information from stereo image pairs, using a conventional disparity algorithm, and associating a confidence score function to the derived first disparity information,
  an artificial intelligence (AI) driven disparity information generating unit configured to receive first images obtained by means of the first camera and second images obtained by means of the second camera, and for deriving second disparity information from stereo image pairs, using an AI algorithm, and
  a fusing unit configured to obtain resultant disparity information by fusing the first disparity information and the second disparity information by giving priority to the first disparity information in regions of the stereo image pairs with high confidence score and giving priority to the second disparity information in regions of the stereo image pairs with low confidence scores.

The system according to the second aspect of the invention may advantageously be used for performing the method according to the first aspect of the invention. The remarks set forth above with reference to the first aspect of the invention are therefore equally applicable here.

Thus, the system according to the second aspect of the invention comprises a first camera and a second camera configured to obtain first and second images, respectively, of stereo image pairs. This has already been described above with reference to the first aspect of the invention.

The system further comprises a conventional disparity information generating unit and an artificial intelligence (AI) driven disparity information generating unit. The conventional disparity information generating unit is configured to derive first disparity information in the manner described above with reference to the first aspect of the invention. Similarly, the AI driven disparity information generating unit is configured to derive second disparity information in the manner described above with reference to the first aspect of the invention.

Finally, the system comprises a fusing unit configured to obtain resultant disparity information by fusing the first disparity information and the second disparity information in the manner described above with reference to the first aspect of the invention.

The fusing unit may be or form part of the AI driven disparity information generating unit. According to this embodiment, the fusing of the first disparity information and the second disparity information is performed by the AI driven disparity information generating unit. This has already been described above with reference to the first aspect of the invention.

As an alternative, the fusing unit may be a separate unit being distinct from the conventional disparity information generating unit and the AI driven disparity information generating unit. This has also been described in detail above with reference to the first aspect of the invention.

According to a third aspect, the invention provides a method for retrieving disparity information from a stereo image pair, the method comprising the steps of:

obtaining a stereo image pair comprising a first image obtained by a first camera and a second image obtained by a second camera, providing the first image and the second image of the stereo image pair to a conventional disparity algorithm, using the conventional disparity algorithm, deriving first disparity information from the stereo image pair and associating a confidence score function to the derived first disparity information, providing the first image and the second image of the stereo image pair, and the first disparity information to an artificial intelligence (AI) driven disparity algorithm, and using the AI driven disparity algorithm, deriving resultant disparity information from the stereo image pair and the first disparity information, by giving priority to the first disparity information in regions of the stereo image pair with high confidence score.

The method according to the third aspect of the invention is very similar to the method according to the first aspect of the invention, and the remarks set forth above with reference to the first aspect of the invention are therefore equally applicable here.

Thus, in the method according to the third aspect, a first image is obtained by a first camera and a second image is obtained by a second camera, and each of the first image and the second image is provided to a conventional disparity algorithm as well as to an artificial intelligence (AI) driven algorithm. This has already been described in detail above with reference to the first aspect of the invention.

Using the conventional disparity algorithm, first disparity information is derived from the stereo image pair, and a confidence score is associated to the first disparity information, essentially in the manner described above with reference to the first aspect of the invention.

The first disparity information, possibly along with the confidence score, is provided to the AI driven disparity algorithm, in addition to the first image and the second image. Using the AI driven disparity algorithm, a resultant disparity information from the stereo image pair and the first disparity information. This is done by giving priority to the first disparity information in regions of the stereo image pair with high confidence score. For instance, this step could include supplementing or replacing the disparity information derived by means of the conventional disparity algorithm by disparity information derived by means of the AI driven disparity information in regions of the stereo image pair with low confidence score.

The step of deriving the resultant disparity information may include separately deriving second disparity information, using the AI driven disparity information, and subsequently fusing the first disparity information and the second disparity information in a suitable manner, so as to arrive at the resultant disparity information. This has already been described above with reference to the first aspect of the invention. However, such second disparity information may not necessarily be derived, i.e. the AI driven disparity algorithm may simply derive the resultant disparity information directly from the first and second images, the first disparity information, and applying the confidence score.

BRIEF DESCRIPTION OF THE DRAWINGS

The invention will now be described in further detail with reference to the accompanying drawings in which:

FIGS. 8-10 illustrate disparity information, distance information and confidence score related to a stereo image pair.

DETAILED DESCRIPTION OF THE DRAWINGS

Figure 1:
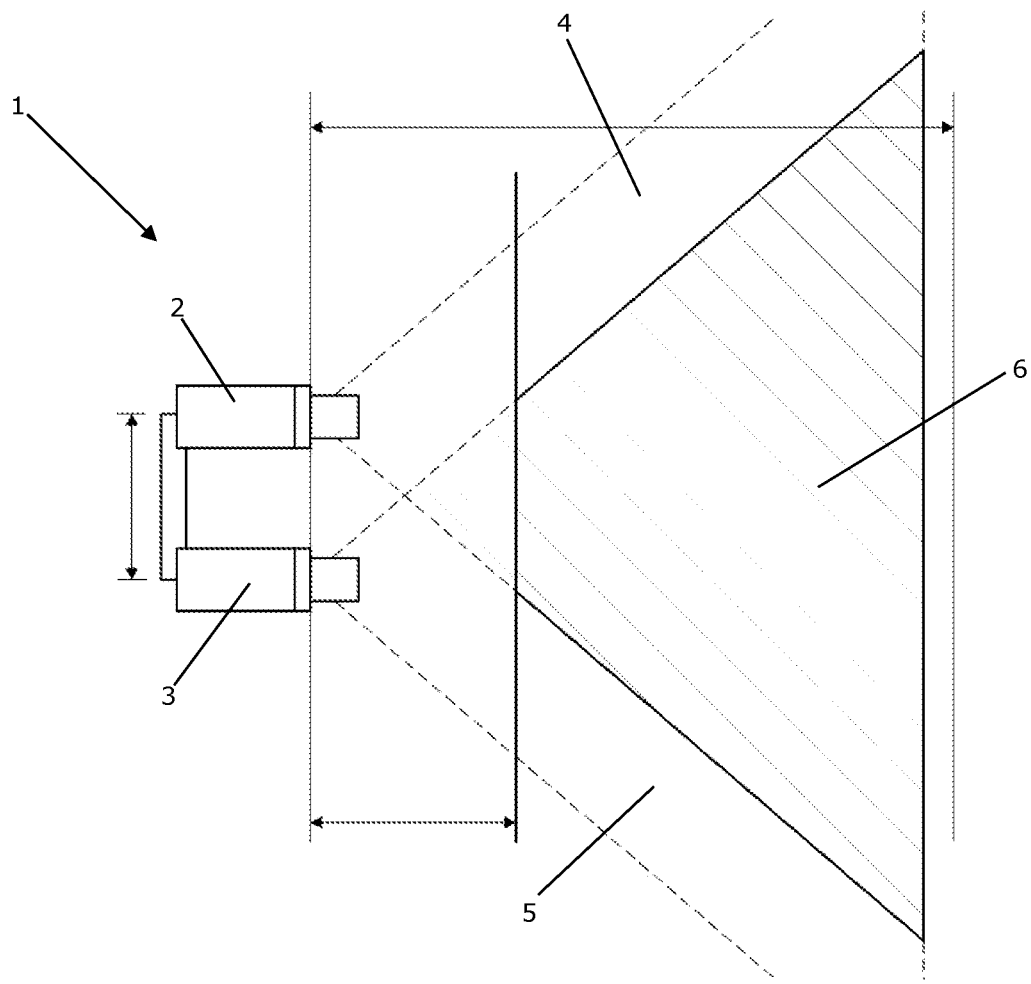
FIGS. 1 and 2 illustrate a system for generating stereo images according to an embodiment of the invention.
Figure 2:
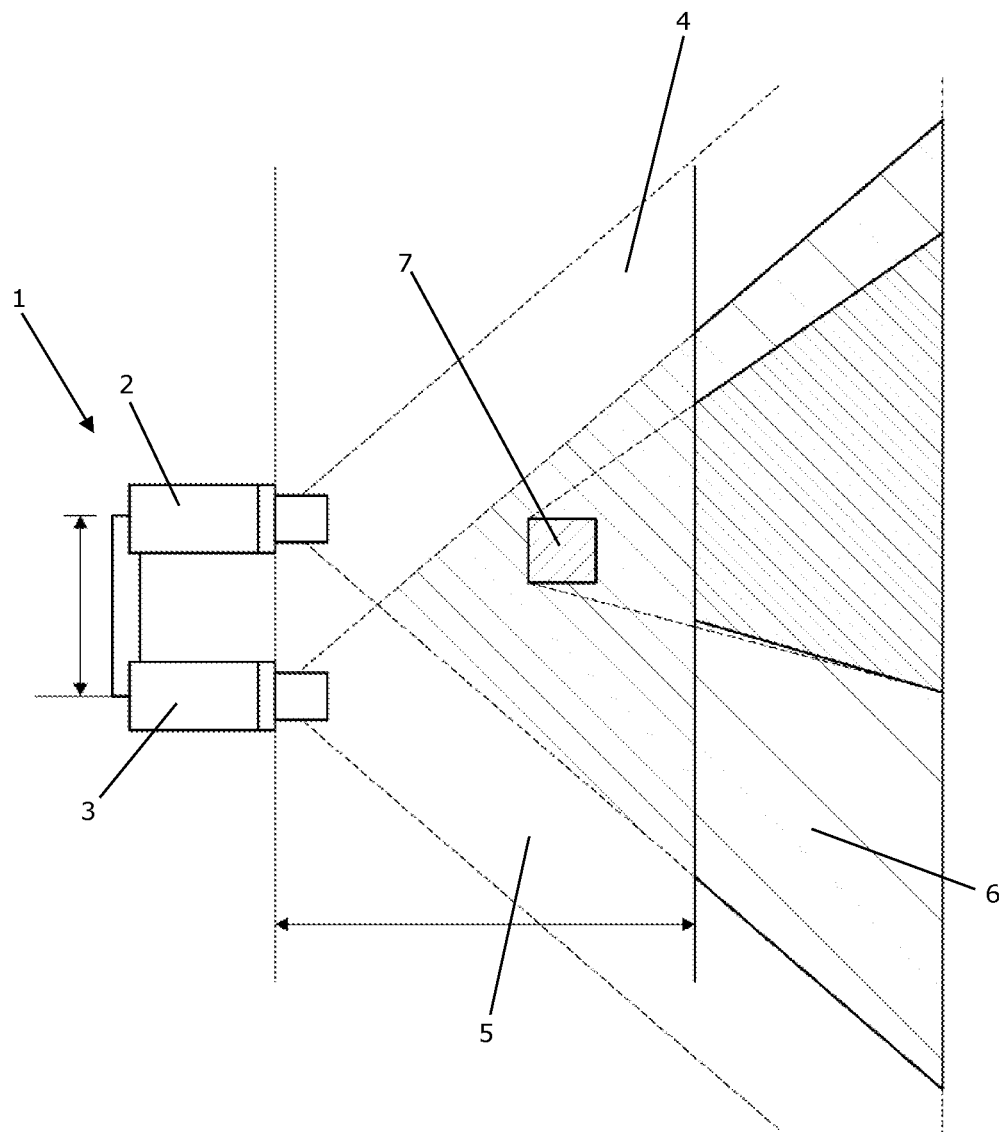

FIGS. 1 and 2 illustrate a system 1 for generating stereo images according to an embodiment of the invention. The system 1 comprises a first camera 2 and a second camera 3 mounted in such a manner that a first detection direction of the first camera 2 and a second detection direction of the second camera 3 are substantially parallel to each other.

The first camera 2 defines a first field of view 4, and the second camera 3 defines a second field of view 5. The first field of view 4 and the second field of view 5 define an overlap region 6 forming part of the first field of view 4 as well as of the second field of view 5. Thus, features or objects arranged within the overlap region 6 will be captured by the first camera 2 as well as by the second camera 3. Accordingly, the system 1 of FIGS. 1 and 2 is capable of generating stereo images based on stereo image pairs obtained by the first camera 2 and the second camera 3.

In FIG. 2, an object 7 is illustrated within the overlap region 6. Accordingly, this object 7 is captured by the first camera 2 as well as by the second camera 3. However, the regions of images captured by the first camera 2 and the second camera 3, respectively, which correspond to the object 7 will be displaced relative to each other, due to the relative displacement of the first camera 2 and the second camera 3. This allows disparity information to be derived from a stereo image pair comprising a first image obtained by the first camera 2 and a second image obtained by the second camera 3. The disparity information may be used for deriving information regarding a distance between the cameras 2, 3 and the object 7, thus deriving depth information from the stereo image pair. The disparity information may, e.g., be derived in the manner described below with reference to FIGS. 3 and 4.

Figure 3:
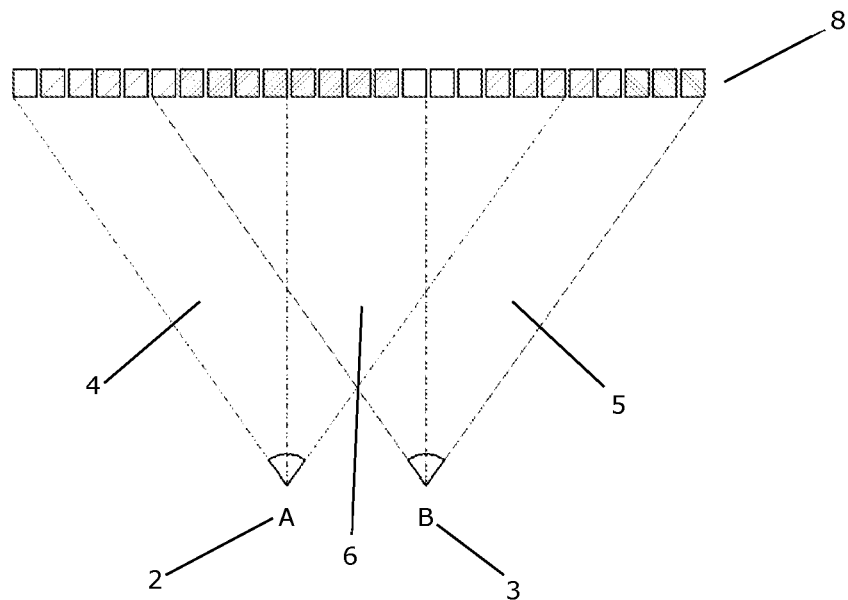
FIGS. 3 and 4 illustrate deriving of disparity information from a stereo image pair as part of a method according to an embodiment of the invention.

FIG. 3 illustrates a first field of view 4 of a first camera 2, a second field of view 5 of a second camera 3, and an overlap region 6 forming part of the first field of view 4 as well as of the second field of view 5, similarly to the setup described above with reference to FIGS. 1 and 2. Furthermore, a line of pixels 8 illustrates images captured by the first camera 2 and the second camera 3, respectively.

Figure 4:
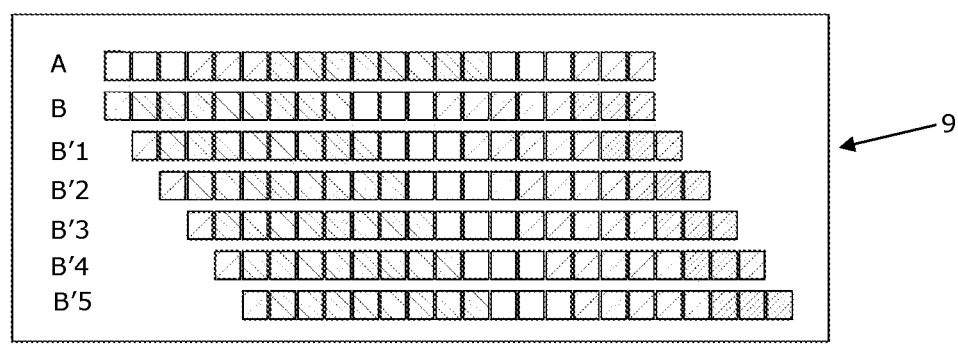
Figure 4:
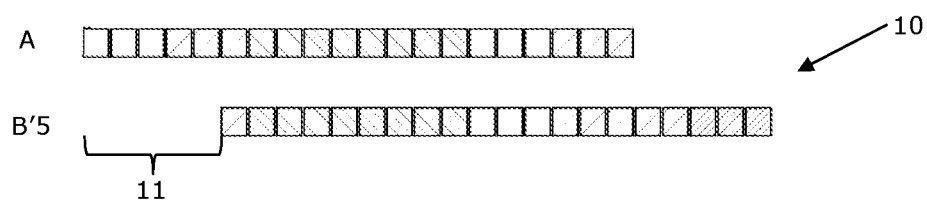

FIG. 4 illustrates a method for deriving disparity information from a stereo image pair using a conventional approach. The upper part 9 of FIG. 4 illustrates images captured by the first camera 2 and the second camera 3, respectively, and corresponds to the line of pixels 8 illustrated in FIG. 3.

The uppermost row denoted "A" corresponds to the first image obtained by means of the first camera 2, and the next row denoted "B" corresponds to the second image obtained by means of the second camera 3, as illustrated in FIG. 3. In the subsequent rows denoted "B'1", "B'2", "B'3", "B'4" and "B'5", respectively, the image obtained by means of the second camera 3 is sequentially shifted towards the right, one pixel at the time, in order to match pixels from the first image and the second image, respectively, which correspond to the same real feature or object. This match is obtained by the row denoted "B'5".

In the lower part 10 of FIG. 4, the row denoted "A", corresponding to the first image obtained by means of the first camera 2, and the row denoted "B'5", corresponding to the second image obtained by means of the second camera 3 and shifted to match the first image, are shown. It can be seen that there is a correspondence between the pixels of row "A" and the pixels of row "B'5" forming the overlap region 6 illustrated in FIG. 3. The total shift or displacement of the second image represents disparity information 11. It may be expected that the closer to the cameras 2, 3 an object or feature is positioned, the further the second image would need to be displaced in order to obtain a match as illustrated in FIG. 4. Thus, information regarding the distance to such an object or feature, and thereby depth information, can be derived from the disparity information 11.

Figure 5:
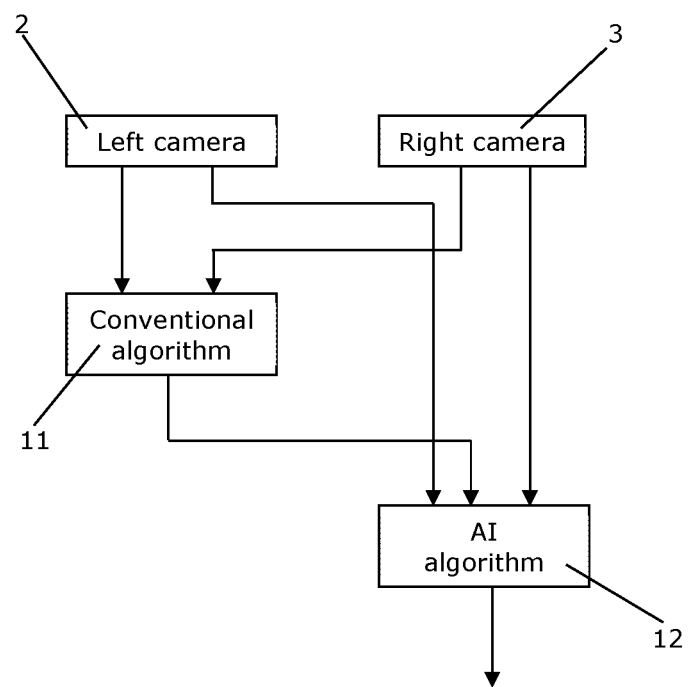
FIGS. 5-7 are block diagrams illustrating methods according to three embodiments of the invention.
Figure 6:
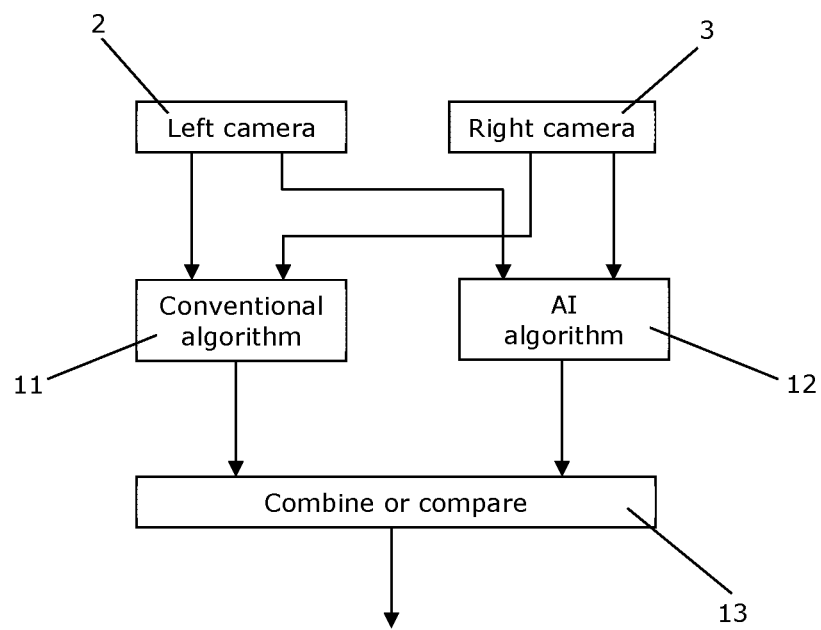
Figure 7:
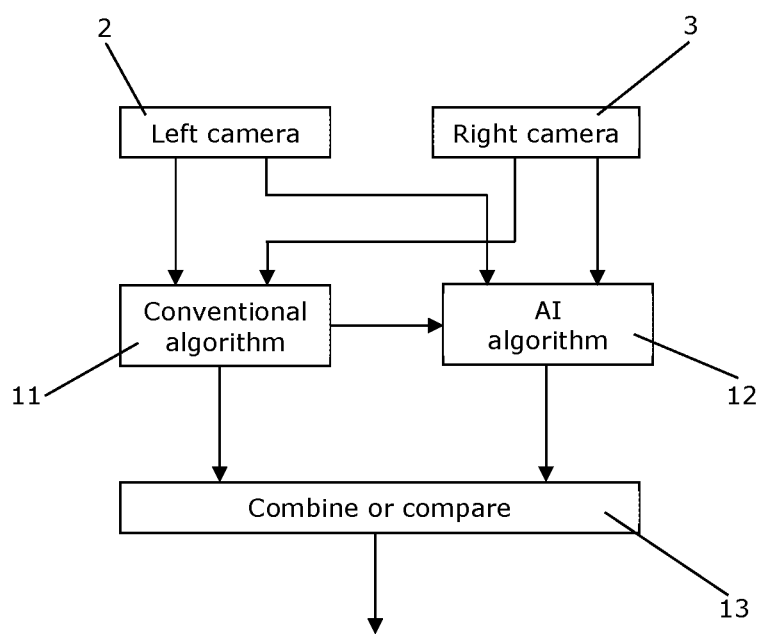

FIGS. 5-7 are block diagrams illustrating methods according to three embodiments of the invention. FIG. 5 illustrates a first camera 2 and a second camera 3 configured to capture first and second images, respectively, similar to the system illustrated in FIGS. 1 and 2.

The first camera 2 obtains a first image and provides this to a conventional disparity algorithm 11 as well as to an AI driven disparity algorithm 12. Similarly, the second camera 3 obtains a second image and provides this to the conventional disparity algorithm 11 as well as to the AI driven disparity algorithm 12. Thus, the conventional disparity algorithm 11 receives a first image from the first camera 2 as well as a second image from the second camera 3. Similarly, the AI driven disparity algorithm 12 receives a first image from the first camera 2 as well as a second image from the second camera 3. Accordingly, the conventional disparity algorithm 11 and the AI driven disparity algorithm 12 are in the possession of the same image material.

Based on the received images, the conventional disparity algorithm 11 is applied for deriving first disparity information using a conventional approach. This could, e.g., be performed in a manner similar to the one described above with reference to FIGS. 3 and 4. Furthermore, a confidence score function is derived which provides a measure for how accurate or reliable the derived first disparity information is. The first disparity information is provided to the AI driven disparity algorithm 12, along with the confidence score function, by the conventional disparity algorithm 11.

The AI driven disparity algorithm 12 is applied for deriving second disparity information, based on the received images. However, in this case an AI based approach is applied. The AI driven disparity algorithm 12 may derive the second disparity information solely based on the received first and second image. Alternatively, the first disparity information received from the conventional disparity algorithm 11 may be taken into account when deriving the second disparity information. For instance, the first disparity information may be used as a seed for the AI driven disparity algorithm 12, and/or the second disparity information may be derived solely for regions in the images having a low confidence score.

Finally, the AI driven disparity algorithm 12 fuses the first disparity information and the second disparity information, so as to obtain resultant disparity information. This is performed in such a manner that, in regions of the image pair with high confidence score, the first disparity information is given priority, whereas in regions of the image pair with low confidence score, the second disparity information is given priority. This ensures that the simple first disparity information is applied to the greatest possible extent, and that the first disparity information is merely replaced or supplemented by the second disparity information in regions of the image pair where the confidence score of the first disparity information is low.

The step of fusing the first disparity information and the second disparity information may take place simultaneously with, possibly as a part of, the step of deriving the second disparity information. As an alternative, the step of fusing the first disparity information and the second disparity information may take place separately, and after the second disparity information has been derived.

FIG. 6 is a block diagram illustrating a method according to an alternative embodiment of the invention. The block diagram of FIG. 6 is very similar to the block diagram of FIG. 5, and it will therefore not be described in detail here. Thus, similarly to FIG. 5, FIG. 6 also shows a first camera 2, a second camera 3, a conventional disparity algorithm 11 and an AI driven disparity algorithm 12. Furthermore, similarly to the embodiment illustrated in FIG. 5, the first camera 2 provides a first image to the conventional disparity algorithm 11 as well as to the AI driven disparity algorithm 12, and the second camera 3 provides a second image to the conventional disparity algorithm 11 as well as to the AI driven disparity algorithm 12.

Also similarly to the embodiment illustrated in FIG. 5, the conventional disparity algorithm 11 derives first disparity information based on the first and second images, and the AI driven disparity algorithm 12 derives second disparity information based on the first and second images.

However, in the embodiment illustrated in FIG. 6, the first disparity information and the second disparity information is provided to a separate fusing algorithm 13, where the step of fusing the first disparity information and the second disparity information is performed, e.g. in the manner described above with reference to FIG. 5.

Furthermore, the separate fusing algorithm 13 may compare the first disparity information and the second disparity information across the images and derive a resultant confidence score function for the resultant disparity information based thereon. For instance, in regions of the images with good agreement between the first disparity information and the second disparity information, it may be assumed that the disparity information is reliable and accurate, and such regions may therefore be assigned a high confidence score. On the other hand, regions where there is disagreement between the first disparity information and the second disparity information, it may be considered less certain what the true disparity information is, and therefore such regions may be assigned a lower confidence score.

FIG. 7 is a block diagram illustrating a method according to yet another alternative embodiment of the invention. The embodiment illustrated in FIG. 7 is very similar to the embodiment illustrated in FIG. 6, and it will therefore not be described in detail here. However, in FIG. 7, the first disparity information, possibly along with the confidence score function, is provided to the AI driven disparity algorithm 12, in addition to being provided to the separate fusing algorithm 13. Thus, the AI driven disparity algorithm 12 may take the first disparity information, and possibly the confidence score function, into account when deriving the second disparity information. This could, e.g., take place in the manner described above with reference to FIG. 5.

Figure 8:
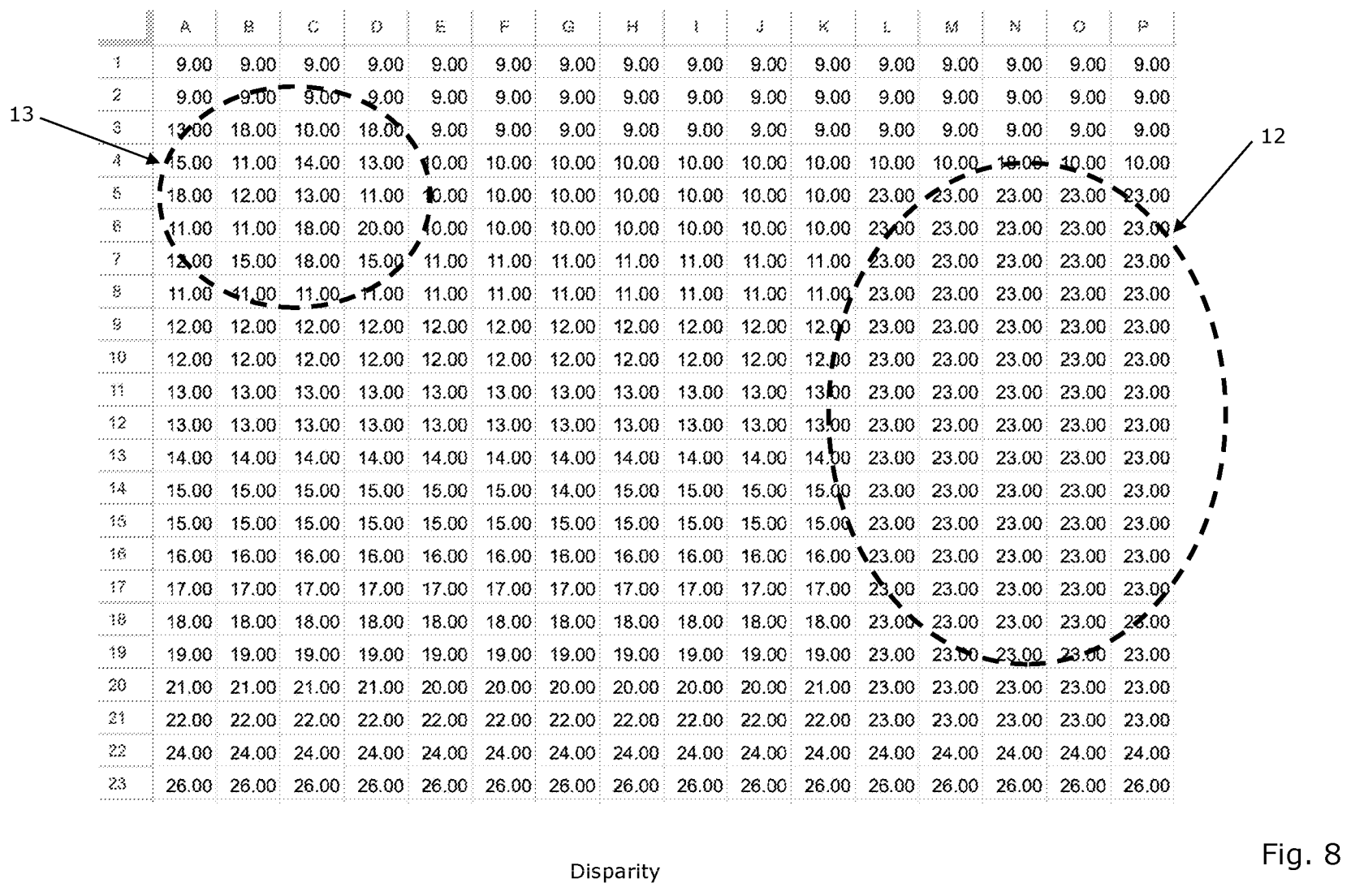
Figure 10:
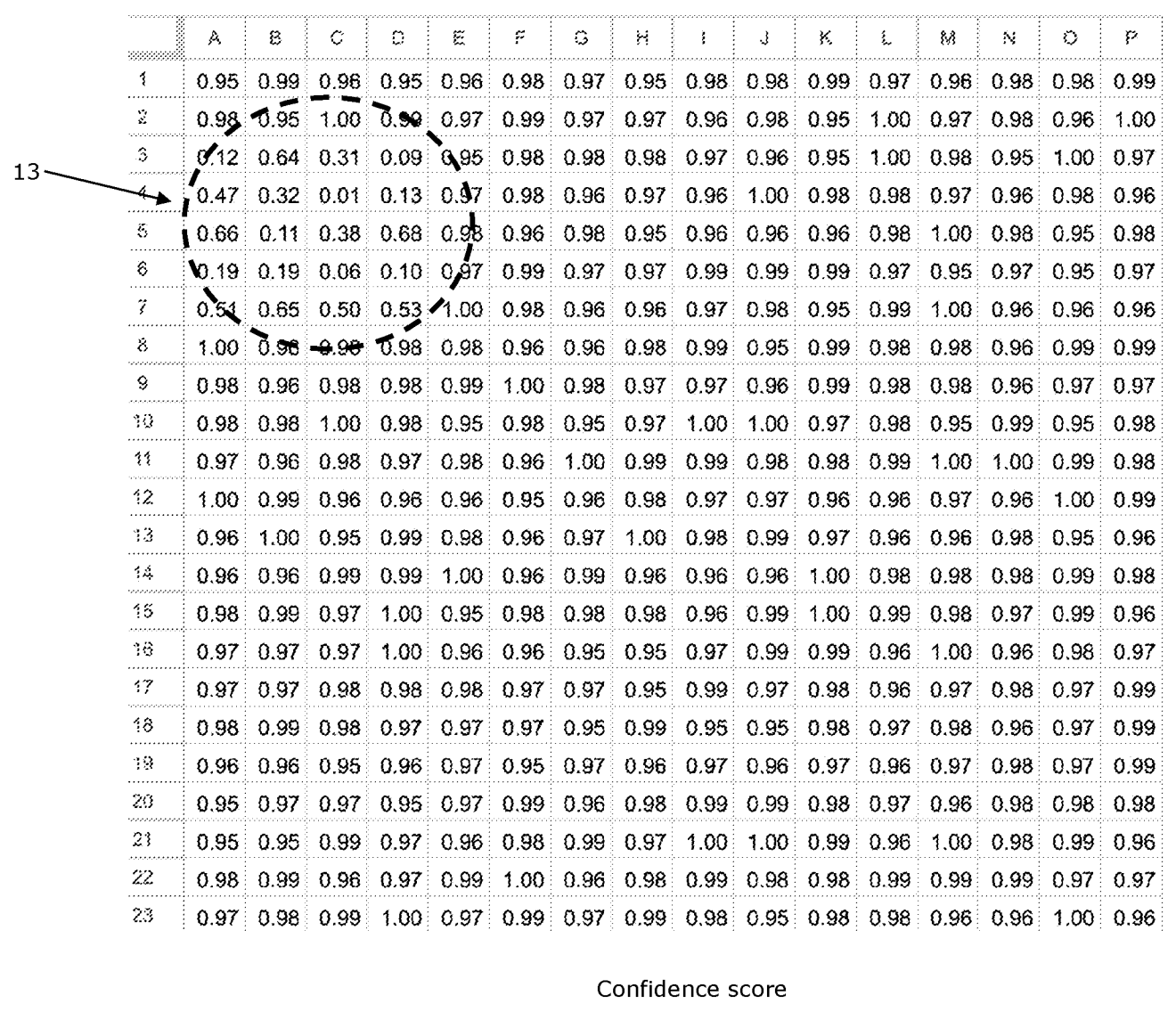

FIGS. 8-10 illustrate disparity information, distance information and confidence score related to a stereo image pair, derived in accordance with a method according to an embodiment of the invention.

FIG. 8 illustrates disparity information derived from the stereo image pair, e.g. in the manner described above with reference to FIGS. 3 and 4. The disparity information is presented as a two-dimensional table, corresponding to pixels of a two-dimensional image provided by the stereo image pair. The numbers in the table represent the disparity derived for the corresponding pixels.

In a region 12 the derived disparity information is very uniform across a large number of pixels. This will be described in further detail below with reference to FIG. 9. In another region 13 the derived disparity information varies significantly between neighbouring pixels. This is an indication that it is difficult to determine the disparity within this region 13. This will be described in further detail below with reference to FIG. 10.

FIG. 9 illustrates distance information regarding the stereo image pair, corresponding to and derived from the disparity information illustrated in FIG. 8. It can be seen that within the region 12, the distance information is identical across a large number of pixels. This is due to the fact that the pixels of region 12 represent a large object which is positioned at a specific distance from the cameras applied for obtaining the images forming the stereo image pair.

In the region 13 the distance information varies significantly between neighbouring pixels, as a consequence of the varying disparity information underlying the distance information within this region 13.

FIG. 10 illustrates confidence score of the stereo image pair of FIGS. 8 and 9, representing how reliable the derived disparity information of the individual pixels is. The confidence score is provided as a number between 0 and 1, where 0 represents very low confidence or reliability of the derived disparity information, and 1 represent very high confidence or reliability of the derived disparity information. It can be seen that throughout the stereo image pair, the confidence score is generally very high, i.e. close to 1. Accordingly, the derived disparity information illustrated in FIG. 8 is generally reliable.

However, in region 13 the confidence score is significantly lower, for some pixels even close to 0. Accordingly, within this region 13, the derived disparity information may not be readily relied on. It may therefore be relevant to replace or supplement the disparity information within region 13 by disparity information derived using an AI driven disparity algorithm, in order to obtain disparity information with a higher confidence score.

The low confidence score of region 13 may be due to features in this part of the image, which render it difficult to derive the disparity information using a conventional disparity algorithm. For instance, pixels with identical or similar information, e.g. due to repetitive patterns in the image, may render it difficult to match features captured by the respective cameras to each other.

The invention claimed is:

1. A method for retrieving disparity information from a stereo image pair, the method comprising the steps of:
    obtaining a stereo image pair comprising a first image obtained by a first camera and a second image obtained by a second camera,
    providing the first image and the second image of the stereo image pair to a conventional disparity algorithm,
    providing the first image and the second image of the stereo image pair to an artificial intelligence (AI) driven disparity algorithm,
    using the conventional disparity algorithm, deriving first disparity information from the stereo image pair and associating a confidence score function to the derived first disparity information,
    using the AI driven disparity algorithm, deriving second disparity information from at least part of the stereo image pair, and
    fusing the first disparity information and the second disparity information by giving priority to the first disparity information in regions of the stereo image pair with high confidence score and giving priority to the second disparity information in regions of the stereo image pair with low confidence score, thereby obtaining resultant disparity information.

2. The method according to claim 1, wherein the confidence score function varies across the stereo image pair.

3. The method according to claim 1, wherein the step of deriving second disparity information is performed only on parts of the stereo image pair with confidence score below a predefined threshold level.

4. The method according to claim 1, further comprising the step of providing the first disparity information to the AI driven disparity algorithm, and wherein the step of fusing the first disparity information and the second disparity information is performed by means of the AI driven disparity algorithm.

5. The method according to claim 4, wherein the step of providing the first disparity information to the AI driven disparity algorithm comprises providing the confidence score function to the AI driven disparity algorithm.

6. The method according to claim 4, wherein the step of fusing the first disparity information and the second disparity information is performed simultaneously with and/or as a part of the step of deriving the second disparity information.

7. The method according to any of claim 1, further comprising the step of providing the first disparity information and the second disparity information to a separate fusing algorithm, and wherein the step of fusing the first disparity information and the second disparity information is performed by means of the separate fusing algorithm.

8. The method according to claim 7, further comprising the step of providing the first disparity information to the AI driven disparity algorithm, and wherein the step of deriving the second disparity information is further performed while taking the first disparity information into consideration.

9. The method according to claim 1, further comprising the steps of comparing the first disparity information and the second disparity information, and deriving a resultant confidence score function for the resultant disparity information, based on the comparison.

10. The method according to claim 1, wherein the step of deriving the first disparity information comprises identifying one or more features present in the first image as well as in the second image, and determining a displacement between the first image and the second image required in order to obtain an overlap in image regions of the first image and the second image, respectively, corresponding to a given identified feature.

11. The method according to claim 1, wherein the step of deriving the second disparity information comprises applying a trained AI model for identifying correspondences between the first image and the second image.

12. The method according to claim 1, wherein the step of fusing the first disparity information and the second disparity information comprises applying the first disparity information in regions of the stereo image pair with a confidence score above a predefined threshold level and applying the second disparity information or supplementing the first disparity information with the second disparity information in regions of the stereo image pair with a confidence score below the predefined threshold level.

13. A system for generating stereo images, the system comprising:
a first camera and a second camera configured to obtain stereo image pairs comprising a first image obtained by the first camera and a second image obtained by the second camera, a conventional disparity information generating unit configured to receive first images obtained by means of the first camera and second images obtained by means of the second camera, and for deriving first disparity information from stereo image pairs, using a conventional disparity algorithm, and associating a confidence score function to the derived first disparity information,
an artificial intelligence (AI) driven disparity information generating unit configured to receive first images obtained by means of the first camera and second images obtained by means of the second camera, and for deriving second disparity information from stereo image pairs, using an AI algorithm, and
a fusing unit configured to obtain resultant disparity information by fusing the first disparity information and the second disparity information by giving priority to the first disparity information in regions of the stereo image pairs with high confidence score and giving priority to the second disparity information in regions of the stereo image pairs with low confidence scores.

14. The system according to claim 13, wherein the fusing unit is or forms part of the AI driven disparity information generating unit.

15. The system according to claim 13, wherein the fusing unit is a separate unit being distinct from the conventional disparity information generating unit and the AI driven disparity information generating unit.

16. A method for retrieving disparity information from a stereo image pair, the method comprising the steps of:
obtaining a stereo image pair comprising a first image obtained by a first camera and a second image obtained by a second camera,
providing the first image and the second image of the stereo image pair to a conventional disparity algorithm,
using the conventional disparity algorithm, deriving first disparity information from the stereo image pair and associating a confidence score function to the derived first disparity information,
providing the first image and the second image of the stereo image pair, and the first disparity information to an artificial intelligence (AI) driven disparity algorithm, and
using the AI driven disparity algorithm, deriving resultant disparity information from the stereo image pair and the first disparity information, by giving priority to the first disparity information in regions of the stereo image pair with high confidence score.

* * * * *